F. BOETTCHER.
CATTLE STANCHION.
APPLICATION FILED APR. 22, 1912.
1,071,136.
Patented Aug. 26, 1913.
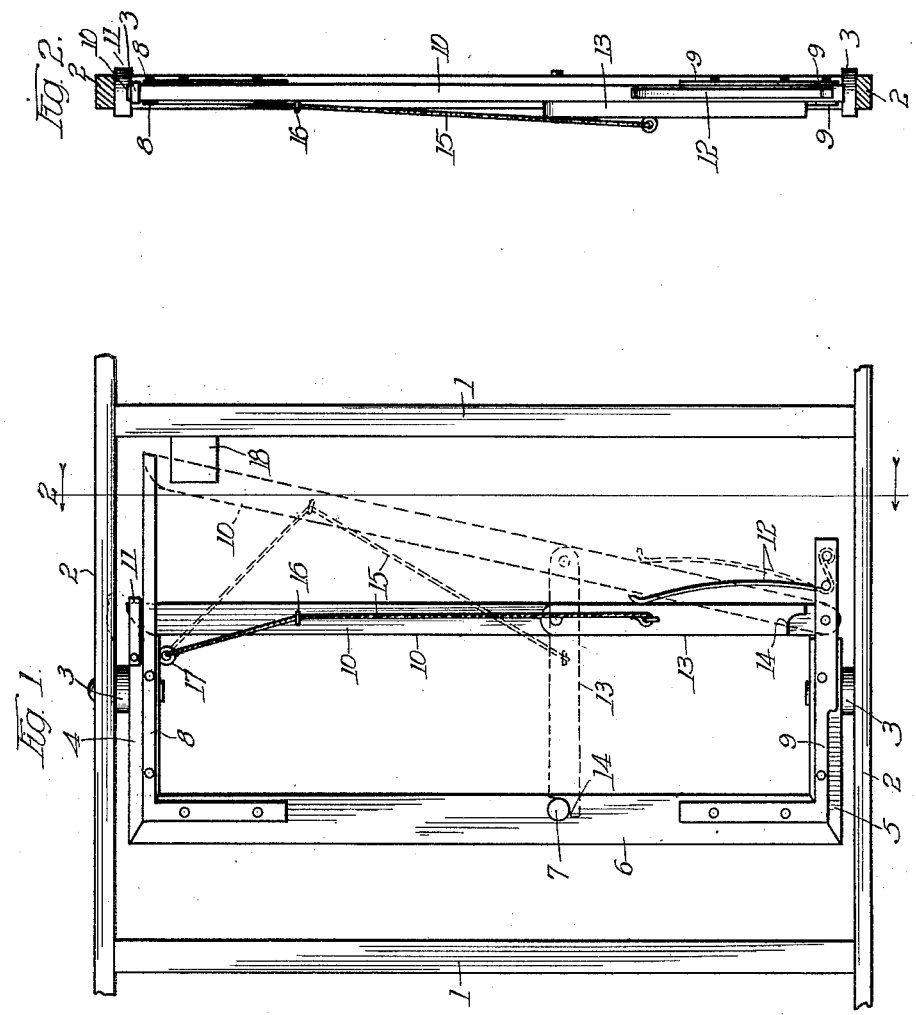

UNITED STATES PATENT OFFICE.

FRANK BOETTCHER, OF BONDUEL, WISCONSIN.

CATTLE-STANCHION.

1,071,136.   Specification of Letters Patent.   Patented Aug. 26, 1913.

Application filed April 22, 1912. Serial No. 692,402.

*To all whom it may concern:*

Be it known that I, FRANK BOETTCHER, a citizen of the United States, residing at Bonduel, in the county of Shawano and State of Wisconsin, have invented certain new and useful Improvements in Cattle-Stanchions, of which the following is a specification.

This invention relates to improvements in cattle stanchions and its object is to provide a device of this class that is very simple in construction and easy of operation and that consequently will be very cheap to manufacture and that hence should prove a practical, merchantable device.

With the foregoing and other objects in view the invention consists in the combination and arrangement of parts to be hereinafter fully described in the following specification, pointed out in the claims and illustrated in the accompanying drawing which forms a part of the specification and in which—

Figure 1 is a front elevation of my improved stanchion. Fig. 2 is a section taken on line 2—2 of Fig. 1.

Like reference characters indicate corresponding parts throughout the several views.

1—1 are a pair of vertical beams connected by horizontal beams 2—2 forming the frame for my stanchion and within which the same is mounted upon pivots 3, 3 which engage upper and lower arms 4 and 5 respectively, which are secured to or made integral with a stanchion post 6 which is provided with a stop pin 7.

8 and 9 are a pair of terminal loops secured one to the upper arm 4 and stanchion post 6 and the other to lower arm 5 and stanchion post 6 and projected beyond the free termination of either arm 4 or 5.

10 is a stanchion bar one extremity of which is pivoted to the loop 9 and the free extremity of which is beveled as shown and which extends, when the bar is in a vertical position, a short distance beyond the loop 8 just far enough therebeyond to engage a gravity loop 11 pivotally secured to the arm 4.

12 is a spring one end of which is disposed within the loop 9 while the opposite end rests upon the stanchion bar 10 and tends to press the same toward the stanchion post.

13 is a trigger pivotally secured to stanchion bar 10 and notched as at 14 at its free extremity and provided with a screw eye to which is secured one end of a rope 15 that passes through another eye 16 carried by the stanchion bar and the other end of which is secured to a screw eye 17 carried by the upper arm 4. To the vertical beam 1 a notched block 18 is secured which is engaged by the stanchion bar 10 when the stanchion is open. Operation: The stanchion is shown, open with the stanchion bar 10, trigger, rope and spring shown in dotted lines. In this position the notched extremity of the trigger engages the stop pin 7 carried by the stanchion post and the pressure of spring 12 upon the stanchion bar is sufficient to enable the device, as long as it is undisturbed, to remain in this position. The stanchion bar being engaged by the notched block 18 oscillation or rotation of the stanchion upon its pivots is prevented. When the animal comes in to feed it will thrust its head between the stanchion post and stanchion bar and its neck coming in contact with the trigger 13 will depress the same moving it from contact with stop pin 7 when the spring 12 will oscillate the stanchion bar toward the stanchion post. When the beveled end of said bar engages the gravity loop 11 it will oscillate the same away from the loop 8 thus permitting the stanchion bar to move into its vertical position with its free end abutting the free termination of the upper arm 4 when the gravity loop will again assume its normal position and the animal will be confined.

What is claimed is:—

1. A cattle stanchion comprising a frame provided with a notched block, a stanchion post provided with terminal arms pivotally mounted in said frame, terminal loops secured to said stanchion post and terminal arms, a gravity loop carried by one of the said terminal arms, a spring-pressed stanchion bar pivotally secured to the other terminal arm for contact with the said gravity loop and capable of engagement with the said notched block, a trigger pivotally secured to said stanchion bar, a flexible member connecting said trigger, stanchion bar and one of the aforesaid arms and a stop pin carried by the aforesaid stanchion post whereby the mechanism may be normally retained in open position.

2. A cattle stanchion comprising a frame provided with a notched block, a stanchion post provided with terminal arms pivotally mounted in said frame, terminal loops secured to said stanchion post and terminal arms, a gravity loop carried by one of the said terminal arms, a spring-pressed stanchion bar pivotally secured to the other terminal arm for contact with the said gravity loop and capable of engagement with the said notched block, a stop pin carried by the aforesaid stanchion post, a notched trigger pivotally secured to the said stanchion bar for engagement with the said stop pin and a rope connecting said trigger, stanchion bar and one of the aforesaid terminal arms.

In testimony that I claim the foregoing as my own I have hereto affixed my signature in the presence of two subscribing witnesses.

FRANK BOETTCHER.

Witnesses:
R. C. WENDT,
J. E. LUTSEY.

Copies of this patent may be obtained for five cents each, by addressing the "Commissioner of Patents, Washington, D. C."